(12) United States Patent
Gao et al.

(10) Patent No.: US 8,666,423 B2
(45) Date of Patent: Mar. 4, 2014

(54) METHOD AND DEVICE FOR DETERMINING ROUTINGS AND FOR ALLOCATING RADIO RESOURCES FOR THE DETERMINED ROUTINGS IN A RADIO COMMUNICATIONS SYSTEM

(75) Inventors: Yan Gao, München (DE); Hui Li, Beijing (CN); Dan Yu, Beijing (CN); Qikai Zhang, Hamburg (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 753 days.

(21) Appl. No.: 10/577,665

(22) PCT Filed: Oct. 20, 2004

(86) PCT No.: PCT/EP2004/052588
§ 371 (c)(1),
(2), (4) Date: Feb. 13, 2007

(87) PCT Pub. No.: WO2005/043835
PCT Pub. Date: May 12, 2005

(65) Prior Publication Data
US 2007/0183373 A1    Aug. 9, 2007

(30) Foreign Application Priority Data
Oct. 31, 2003    (DE) .................................. 103 50 895

(51) Int. Cl.
*H04W 72/00*    (2009.01)
*H04B 7/14*    (2006.01)
*H04B 7/15*    (2006.01)

(52) U.S. Cl.
USPC ..... 455/450; 455/451; 455/452.1; 455/452.2; 455/445; 455/422.1; 455/7; 455/11.1; 455/13.1; 370/315; 370/328; 370/329; 370/330; 370/341

(58) Field of Classification Search
USPC ......... 370/338, 401, 402, 230, 235, 400, 315, 370/322, 328, 329, 330, 341, 351; 455/428, 455/11.1, 41.2, 452.1, 7, 13.1, 422.1, 445, 455/450, 451, 452.2
See application file for complete search history.

(56) References Cited

U.S. PATENT DOCUMENTS 5,412,654 A    5/1995    Perkins
5,781,860 A *  7/1998    Lopponen et al. ......... 455/426.1
(Continued)

FOREIGN PATENT DOCUMENTS

DE    101 26 618 A1    12/2002
EP    0 921 668 A2    6/1999
(Continued)

OTHER PUBLICATIONS

International Search Report date Apr. 25, 2005.
(Continued)

*Primary Examiner* — Olumide T Ajibade Akonai
(74) *Attorney, Agent, or Firm* — Staas & Halsey LLP

(57) ABSTRACT

A method for radio communication between a device and radio stations of a radio communications system having a plurality of radio stations involves transmitting messages from the transmitting radio station to the receiving radio station either directly, or via a routing the passes through one or more radio stations that forward said messages. The device transmits information, which related to one or more routings between a respective transmitting radio station and a receiving radio station and to radio resources that are to be used for at least one message transmission via the routing or routings, to radio stations.

21 Claims, 3 Drawing Sheets

(56) References Cited

U.S. PATENT DOCUMENTS

| | | | |
|---|---|---|---|
| 6,307,843 B1 * | 10/2001 | Okanoue | 370/312 |
| 6,473,617 B1 * | 10/2002 | Larsen et al. | 455/446 |
| 6,580,704 B1 | 6/2003 | Wellig et al. | |
| 7,003,311 B2 * | 2/2006 | Ebata et al. | 455/525 |
| 7,027,773 B1 * | 4/2006 | McMillin | 455/41.2 |
| 7,143,183 B2 * | 11/2006 | Nie | 709/238 |
| 7,218,891 B2 * | 5/2007 | Periyalwar et al. | 455/13.1 |
| 7,330,468 B1 * | 2/2008 | Tse-Au | 370/389 |
| 7,433,691 B1 * | 10/2008 | White | 455/445 |
| 7,580,394 B2 * | 8/2009 | Garcia-Luna-Aceves | 370/338 |
| 2002/0036987 A1 | 3/2002 | Garcia-Luna-Aceves et al. | |
| 2002/0090949 A1 * | 7/2002 | Stanforth | 455/445 |
| 2002/0173310 A1 * | 11/2002 | Ebata et al. | 455/445 |
| 2004/0071128 A1 * | 4/2004 | Jang et al. | 370/349 |
| 2004/0109428 A1 * | 6/2004 | Krishnamurthy | 370/338 |
| 2005/0007985 A1 * | 1/2005 | Park et al. | 370/338 |

FOREIGN PATENT DOCUMENTS

| | | | | |
|---|---|---|---|---|
| WO | WO 99/11081 A2 | 3/1999 | | |
| WO | WO 01/28170 A2 | 4/2001 | | |
| WO | WO 03/001819 * | 6/2002 | | H04Q 7/20 |
| WO | WO 02/069577 A1 | 9/2002 | | |
| WO | WO 03/001819 A2 * | 1/2003 | | H04Q 7/00 |

OTHER PUBLICATIONS

German Office Action dated Aug. 3, 2004.

IEEE Std 802.11, 1999 Edition, "Information technology—Telecommunications and information exchange between systems—Local and metropolitan area networks—Specific requirements—Part 11: Wireless LAN Medium Access Control (MAC) and Physical Layer (PHY) Specifications".

* cited by examiner

FIG 4
```
MS1, MS, MS3 :  Slot1, Slot2, Slot5
MS2, MS, MS4 :  Slot3, Slot4
```
                                    — MESSAGE
FIG 5A
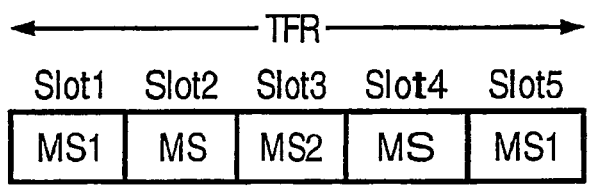
FIG 5B
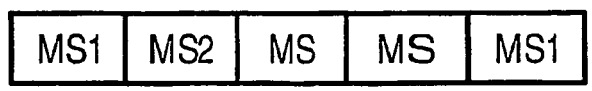
FIG 5C

METHOD AND DEVICE FOR DETERMINING ROUTINGS AND FOR ALLOCATING RADIO RESOURCES FOR THE DETERMINED ROUTINGS IN A RADIO COMMUNICATIONS SYSTEM

CROSS REFERENCE TO RELATED APPLICATIONS

This application is based on and hereby claims priority to PCT Application No. PCT/EP2004/052588 filed on Oct. 20, 2004 and German Application No. 10350895.3 filed on Oct. 31, 2003, the contents of which are hereby incorporated by reference.

BACKGROUND OF THE INVENTION

The invention relates to a method for communication by radio between a device and radio stations of a radio communications system. Furthermore the invention relates to a device for communication by radio with radio stations of a radio communications system.

In radio communications systems information (for example speech, picture information, video information, SMS (Short Message Service) MMS (Multimedia Messaging Service) or other data) is transmitted with the aid of electromagnetic waves over a radio interface between transmitting and receiving station. The radio stations can in this case, depending on the actual embodiment of the radio communications system, be various types of subscriber-side radio stations, radio access points or base stations. The electromagnetic waves in such systems are radiated using carrier frequencies which lie within the frequency range provided for the relevant system.

Radio communications systems are often embodied as cellular systems, e.g. in accordance with the GSM (Global System for Mobile Communication) or UMTS (Universal Mobile Telecommunications system) standard, with a network infrastructure including base stations, devices for checking and control of the base stations and further network-side devices. Frequencies at 900, 1800 and 1900 MHz are used for the cellular GSM mobile radio system.

As well as these cellular, hierarchical radio networks organized on a wide-area (supralocal) basis, there are also Wireless Local Area Networks (WLANs) with a radio coverage area that as a rule is far more limited. The cells covered by the radio access points (AP) of the WLANs, with a radius of up to a few hundred meters, are small by comparison with usual mobile radio cells. Examples of different standards for WLANs are HiperLAN, DECT, IEEE 802.11, Bluetooth and WATM.

Generally the non-licensed frequency range around 2.4 GHz is used for WLANs. Data transmission rates range up to around 11 Mbit/s. Future WLANs can be operated in the 5 GHz range and will achieve data rates of over 50 Mbit/s. This provides subscribers of the WLANs with data rates which are significantly higher than those offered by the third mobile radio generation (such as UMTS for example). This means that for the transmission of large volumes of data, especially in connection with Internet accesses, access to WLANs for high-bit-rate connections is advantageous.

A connection to other communications systems, for example to Broadband Data Networks (BDN) can thus be made via the WLAN radio access points. To this end the radio stations of the WLAN communicate either directly with a radio access point or with more remote radio stations via other radio stations which forward the information between the radio station and the radio access point over a routing between the radio station and the radio access point.

In an ad-hoc mode of a radio communications system radio stations can communicate with each other via one or more hops (hop, multihop) without the intermediate connection of switching devices such as base stations or radio access points for example. If for example a radio station intends to transmit messages to another radio station outside the radio coverage area, as is often the case in an ad-hoc mode for example, a route must then first be determined between the transmitting and the receiving radio station. A route passes through one or more radio stations which forward messages for a transmission between transmitting and receiving radio station. The radio stations of the route are thus directly adjacent radio stations which can communicate with each other directly via radio.

Document WO 01/28170 A2 describes an ad-hoc computer network in which packets are sent. The nodes of the network send "scheduling packets" with information about other nodes which are located up to two hops away from the relevant node. The "scheduling packets" also contain information about occupied and free channels.

A routing can for example be determined by radio stations using a variety of methods for decentralized routing determination. A plurality of signaling messages are generally sent in this case, so that a significant strain can be imposed on the scarce radio resources through the determination of the routing. As an alternative a routing can also be determined by a centrally supported method for routing determination which includes a device which knows about adjacent relationships between radio stations or about the current network topology. After the device has notified the radio stations about the routing which it has determined, the radio stations can then transmit messages over the routing, in which case, for each message forwarded, the relevant forwarding radio station has to have access to the radio resources. In accordance with the IEEE 802.11 standard this type of access is undertaken for example using the CSMA (Carrier Sense Multiple Access) method. The disadvantage of this however is that the complete transmission of a message over the routing can be delayed because of unsuccessful access to the radio resources or because of the fact that an access is not possible because the radio resources have been reserved by other radio stations, so that the routing becomes outdated in the meantime and complete message transmission is no longer possible via this routing Furthermore, where there is uncoordinated access by the transmitting radio station and the radio stations of the routing to the radio resources, it is possible for a radio station to receive so many messages for forwarding that its memory becomes overloaded, resulting in messages being lost or having to be discarded.

SUMMARY OF THE INVENTION

One possible object of the invention is to demonstrate a method for communication between a device and radio stations of a radio communications system which enables radio stations to efficiently transmit messages via a routing. Furthermore a device for carrying out the method is to be demonstrated.

The inventors propose a method for communication by radio between a device and radio stations of a radio communications system comprising a plurality of radio stations. In the radio communications system messages are transmitted from transmitting to receiving radio stations directly or via one or more radio stations routing the messages. The device sends information to radio stations about one or more routings between a transmitting and a receiving radio station in each case and for at least one message transmission about the radio resources to be used by the routing or routings.

The device can in this case be an element of the same radio communications system as the radio stations, or also of another radio communications system. At least a part of the radio station of the radio communications system is able to communicate with the device via radio, so that these radio stations receive the information from the device and where necessary can also send messages to the device. The device can for example be a base station of a cellular radio communications system. The radio stations of the radio communications system can for example be subscriber-side radio stations or radio access points of a WLAN.

The information about the routing which the device sends can for example be details of transmitting radio stations, receiving radio stations and the radio stations of the routing via which messages are forwarded between the transmitting and the receiving radio station, and where necessary a routing number. The transmitting and receiving radio station do not have to be equipped differently from other radio stations of the radio communications system, it is especially possible for each radio station of the radio communications system to be able to function both as a transmitting station and as a message-forwarding radio station of a routing.

If the device sends information about a plurality of routings, it is possible that parts of the routings will match, so that routings have a common transmitting or a common receiving radio station and/or common forwarding radio stations for example. The information sent concerning the radio resources to be used relates to those routings over which information was sent from the device. A specification of radio resources to be used can for example be a frequency and/or time and/or code and/or space direction specification.

In accordance with a further development, the device determines the routing or the routings using knowledge about adjacent relationships between radio stations of the radio communications system. In particular the device determines a routing on request, for example at the request of the transmitting radio station. The adjacent relationships used for routing determination have been advantageously communicated beforehand to the device by radio stations.

The information about the routing or the routings and about the radio resources is sent in a common message. Thus a single message is used, containing both information about the routing or the routings and also information about the associated radio resources to be used.

In accordance with an embodiment the information about the radio resources in relation to at least one routing comprises an allocation of radio resources to the transmitting radio station of the routing and/or to one or more radio stations through which the routing passes. An allocation of radio resources to radio stations can be undertaken in this case singly so that specific individual radio stations are allocated radio resources or also collectively by allocating radio resources to a group of radio stations. Thus the transmitting radio station and the radio stations via which a routing passes can be allocated radio resources as complete unit.

Messages are preferably transmitted between the radio stations in time slots. Furthermore the information about the radio resources relating to at least one routing includes an allocation of a least one time slot to the transmitting radio station of the at least one routing and/or to one or more radio stations through which the at least one routing passes. The radio communications system in this case features a TDMA component (TDMA: Time Division Multiple Access). However the system does not have to be a pure TDMA system; for example a mixture of FDMA (FDMA: Frequency Division Multiple Access) and TDMA is possible. The allocation of the time slots can be undertaken as described above, by for example allocating a first time slot to a first radio station, a second time slot to a second radio station etc. Likewise a collective allocation such as that described above is possible. For a collective allocation of time slots to a group of radio stations the radio stations then divide up the allocated time slots between themselves. The type of division can for example be defined in a another message sent by the device.

In a development such an allocation of time slots in relation to the at least one routing includes the fact that the transmitting radio station of the at least one routing and all radio stations through which the at least one routing passes are allocated time slots In this case it is possible for a least one message or a data packet of to be transmitted from the transmitting to the receiving radio station of the relevant routing using the allocated time slots.

It is advantageous for a plurality of consecutive time slots in each case to be collected into a time frame and for the transmitting of the information by the device to be undertaken before or at the beginning of a time frame and for the information about the radio resources to relate to time slots of this time frame. A corresponding transmission of information by the device can occur especially before or at the beginning of each time frame so that the information is sent periodically by the device. Advantageously the content of the information about the routing or the routings and about the radio resources changes at least partly from time frame to a time frame.

In a further development such an allocation of time slots in relation to at least one routing includes the information that the transmitting radio station of the at least one routing and one or more radio stations through which a routing passes are as a whole allocated to consecutive time slots. Thus a block of consecutive time slots which are exclusively allocated for message transmission over a single routing exists. Preferably the number of time slots of the relevant block corresponds to the number of hops for a message transmission from the relevant transmitting radio station to the relevant receiving radio station. In this case, using the block of time slots, precisely one data packet of the length of one time slot can be transmitted from the relevant transmitting radio station to the relevant receiving radio station.

It is also possible for such an allocation of time slots in relation to at least one routing to include the information that the transmitting radio station of the at least one routing and one or more radio stations through which the at least one routing passes are as a whole allocated time slots which are spaced from each other in time. This means that all time slots which are allocated to the transmission of messages over a routing are spaced in time from each other and thus are not directly consecutive. The other time slots between the time slots allocated to the routing can then be allocated to other routings for message transmission. Advantageously the distance between the individual time slots allocated to a routings corresponds to the number of the other routings via which information is sent and to which time slots are allocated. If for example three different routings are allocated time slots for message transmission, the first, the fourth, the seventh time slot etc. can be allocated to the first routing for communication.

Advantageously such an allocation of time slots to radio stations in relation to at least one routing includes the information that the chronological order of the allocated time slots corresponds to the order of message transmission over the at least one routing. In this case the first of the time slots assigned to the routing is allocated to the transmitting radio station of the routing, the second of the time slots assigned to the routing is allocated to the first radio station which forwards the message etc. The allocated time slots can in this case be directly consecutive or can be spaced in time from each other respectively.

In a development such an allocation of time slots in relation to at least one routing contains the information that before the beginning of the transmission of a second message over the at least one routing using the allocated time slots, each first message previously sent using the allocated time slots is to be able to be transmitted to the receiving radio station of the routing. The assignment of the time slot by the device is thus undertaken such that the transmitting radio station of the routing may only send a second message over the routing if a first message sent by it was able to reach the receiving radio station of the routing with correct forwarding by the radio stations of the routing.

In accordance with an advantageous embodiment a plurality of consecutive time slots are grouped into a time frame in each case and radio stations send information at a time frame or before the beginning of a time frame about at least one a message to be sent in each case to a device. This information sent by the radio stations relates in particular to the scope of the messages to be sent, for example in the form of a specification of a plurality of time slots which will be needed for transmitting the messages. In this case a number equal to or greater than one is specified to the device by the relevant radio station, if there is no message present to be sent the radio station does not send any notification to the device. The radio stations which send the device information about the messages to be sent are for example transmitting radio stations of routings but are also radio stations forwarding messages which have previously received one or more messages and have not yet forwarded these messages. Advantageously the information about the messages to be sent also includes details about the relevant receiving radio station. The information about the messages to be sent is sent at or before the beginning of a time frame so that the device can allocate the relevant radio stations radio resources in this time frame.

In accordance with an advantageous embodiment such an allocation of time slots includes the fact that the number and/all the position in time of at least one time slot allocated to at least one radio station depends on the relevant scope of the at least one message to be sent from the at least one radio station. In this case those radio stations of which the memory currently has a very high level of load are given preferential treatment in the allocation of radio resources.

It is advantageous for such an allocation of time slots to include the fact that the number and/or the position in time of at least one time slot allocated to at least one radio station depends on whether the at least one radio station has received the at least one message to be sent previously for forwarding. In this case preference is given to those radio stations in the allocation of radio resources which function as relay stations. This method supports a rapid transmission of a message sent by a transmitting radio station to the relevant receiving radio station.

In accordance with an embodiment the device sends the information about the routing or the routings and about the radio resources by broadcasting it. Thus the information sent by the device is not addressed to the individual radio stations as recipients of the messages so that basically all radio stations within the radio coverage area of the device receive the information and can process it. The advantage of this is that a message transmitted over a routing which relates to the information sent by the device does not have to contain a complete routing specification since those radio stations which forward the message know from the information sent by the device over the routing about the relevant adjacent stations to which the message is to be forwarded. This enables the signaling overhead to be reduced.

The device features a memory to store adjacent relationships between radio stations of the radio communications system as well as a transmitter to transmit information to radio stations about one or more routings between a transmitting and receiving radio station respectively and about radio resources to be used for at least one message transmission over the routing all the routings. This information can especially be sent within the framework of a single message. Preferably the information about the radio resources relates to time slots of a radio communications system with a TDMA component.

In a development, the device also features a unit to determine routings between a transmitting and receiving radio station in each case and a unit to allocate radio resources to the transmitting radio station of the relevant routing and/or to one or more radio stations through which the relevant routing passes. It is especially possible to allocate time slots in accordance with the method described above with the device.

In accordance with one embodiment the device further features a receiver to receive information about messages to be sent by radio stations from the radio stations concerned. The device can evaluate these messages and take them into consideration when allocating radio resources. Also advantageous is the presence of a receiver to receive information about adjacent relationships between radio stations of the radio communications system and about a receiver to receive messages with a request for determining at least one routing between radio stations of the radio communications system It is possible for the device to be formed of a plurality of interconnected individual devices so that the components specified above of the device are located not in a single device but in a plurality of devices. The device is especially suitable for executing the method described above.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 4: the layout of a message sent from the base station to mobile stations, FIG. 5a: a first allocation of time slots of a time frame to mobile stations, FIG. 5b: a second allocation of time slots of a time frame to mobile stations, FIG. 5c: a third allocation of time slots of a time frame to mobile stations,

DETAILED DESCRIPTION OF THE PREFERRED EMBODIMENT

Figure 1:
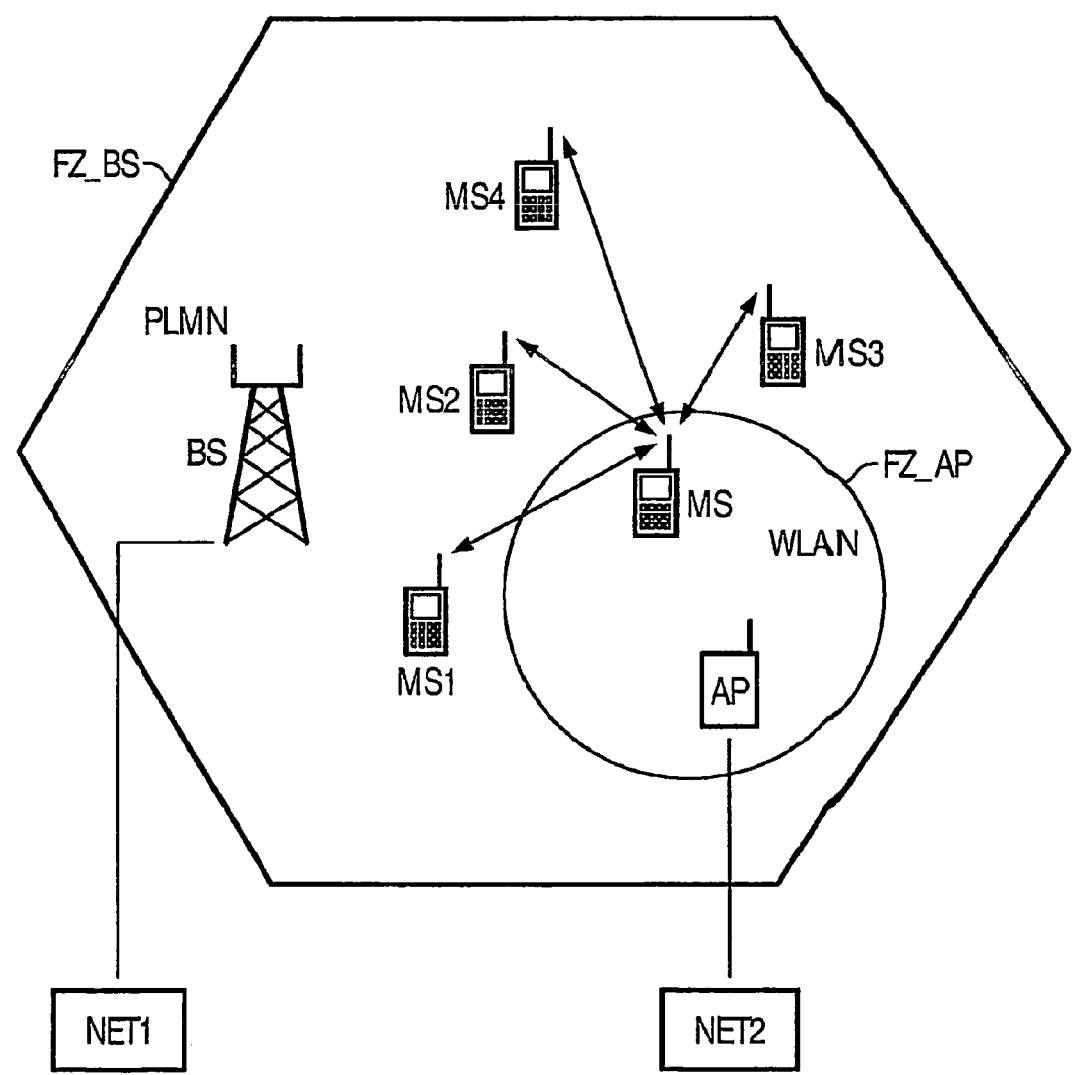
FIG. 1: a section of two radio communications systems.

Reference will now be made in detail to the preferred embodiments of the present invention, examples of which are illustrated in the accompanying drawings, wherein like reference numerals refer to like elements throughout.

FIG. 1 shows a radio cell FZ_BS of a base station BS of a cellular radio communications system PLMN. In this case the base station BS is connected to further network-side devices NETZ of the radio communications system PLMN. Further radio cells of the full coverage radio communications system PLMN are not shown in the diagram in order to reduce its complexity.

Within the radio cell FZ_BS of the base station BS are mobile stations MS, MS1, MS2, MS3 and MS4 of a local radio communication system WLAN. The mobile station MS is also located within the radio coverage area FZ_AP of a radio access point AP of the local radio communications system WLAN. The radio access point AP is connected to further network-side devices NETZ of the local radio communications system WLAN via which it is possible to connect the local radio communications system WLAN to other data and communication networks, such as to the radio communications system PLMN for example. Any further radio access points of the local radio communications system WLAN which may be present are not shown in FIG. 1 to reduce the complexity of the diagram.

The mobile stations MS, MS1, MS2, MS3 and MS4 of the local radio communication system WLAN are equipped in each case with a radio interface for communication with the base station BS of the cellular radio communications system PLMN and with a radio interface for communication between themselves and with the radio access point AP within the local radio communications system WLAN.

Since the mobile station MS is located within the radio coverage area FZ_AP of the radio access point AP a direct communication between the radio access point AP and the mobile station MS is possible. The mobile stations MS1, MS2, MS3 and MS4 however cannot communicate directly with the radio access point AP, so that the mobile station MS operates as a relay station for a communication between the mobile stations MS1, MS2, MS3 and MS4 and the radio access point AP, indicated in FIG. 1 by double arrows between the mobile stations MS1, MS2, MS3 and MS4 and the mobile station MS.

The radio medium is accessed within the local radio communications system WLAN using the TDMA method. Communication thus takes place within time slots, with a sequence of five consecutive time slots being grouped into a time frame in each case. A data packet is sent in each time slot.

Messages transmitted between the mobile stations of the local radio communications system WLAN in an ad-hoc mode are not transmitted via the radio access point AP. Instead the mobile stations of the local radio communications system WLAN communicate directly with each other. For transmitting of messages to a non-adjacent mobile station however, a routing between transmitter and receiver must be determined prior to the transmission of the message. In this case the base station BS is responsible for the determination of a routing between transmitter and receiver.

Figure 2:
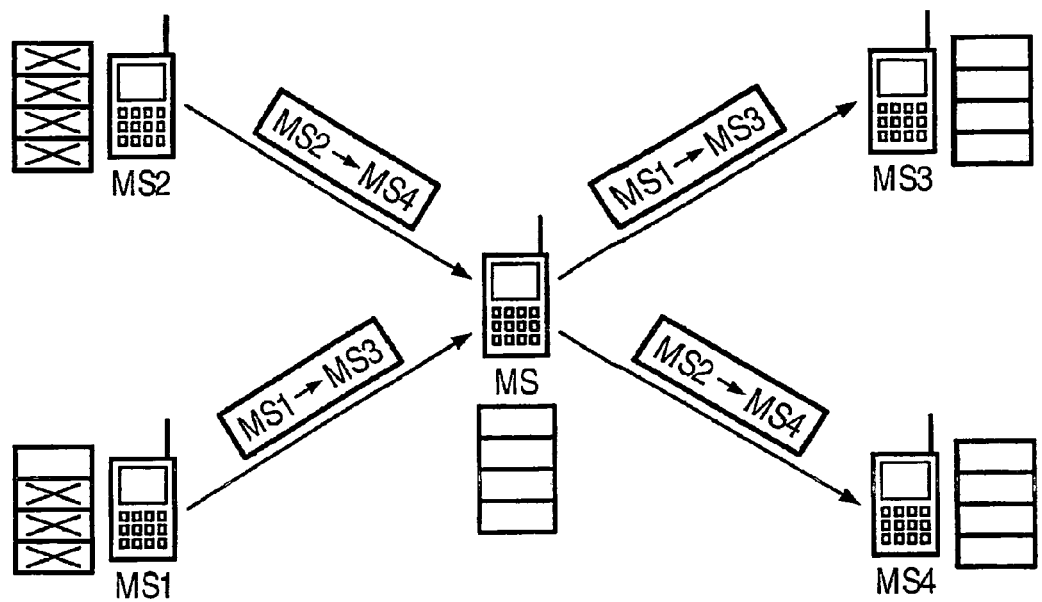
FIG. 2: two routings between radio stations of a radio communications system.

FIG. 2 shows the case in which the mobile station MS1 intends to send a message MS1•MS3 to the mobile station MS3. Each of the mobile stations MS, MS1, MS2, MS3 and MS4 has a memory which can hold four data packets, shown in FIG. 2 by the rectangles divided into four strips for the mobile stations MS, MS1, MS2, MS3 and MS4. The message MS1•MS3 has three data packets, indicated by the occupancy of three strips of the memory of the mobile station MS1. The mobile station MS2 intends to send a message having 4 data packets MS2•MS4 to the mobile station. The messages MS1•MS3 and MS2•MS4 are each transmitted over a routing, with the two routings running via the mobile station MS. The determination of the two routings is described below.

Before the messages MS1•MS3 and MS2•MS4 can be transmitted, the senders, i.e. the mobile stations MS1 and MS2, each submit a request for determination of a routing to the base station BS. This request contains the number of data packets to be sent and identification information about the recipients in each case, i.e. the mobile stations MS3 and MS4.

Figure 3:
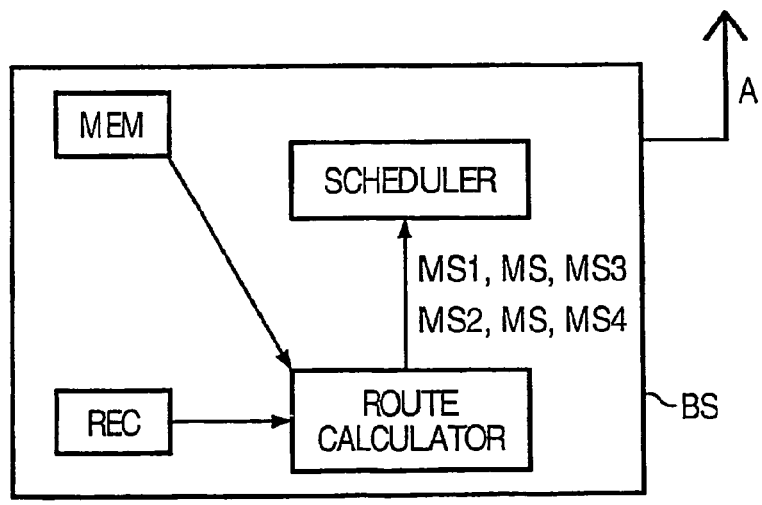
FIG. 3: the layout of a base station according to one embodiment of the invention.

FIG. 3 shows the layout of the base station BS. With its receiver REC the base station BS receives the requests for routing determination from the mobile stations MS1 and MS2. The topology of the network of the mobile stations MS, MS1, MS2, MS3 and MS4 of the local radio communications system WLAN is stored in the memory MEM. The adjacent relationships are determined by the mobile stations MS, MS1, MS2, MS3 and MS4 at regular intervals and sent to the base station BS. In the device ROUTE CALCULATOR the requests of the mobile stations MS1 and MS2 are evaluated and routings to the relevant receivers determined, with the stored adjacent relationships being used in this case. The routing MS1,MS,MS3 is determined for transmission of messages between the mobile station MS1 and the mobile station MS2 and the routing MS2,MS,MS4 is determined for the transmission of messages between the mobile station MS2 and the mobile station MS4. The two routings determined, MS1,MS,MS3 and MS2,MS,MS4, are transferred to the device SCHEDULER which is responsible for medium access control and thus for the allocation of radio resources. The device SCHEDULER allocates to the two routings radio resources of the following time frame, then the message shown in FIG. 4 MESSAGE is broadcast via the antenna A to the mobile stations MS, MS1, MS2, MS3 and MS4 of the local radio communications system WLAN.

The message MESSAGE of FIG. 4 contains the names of the two routings, with the transmitter, all relay stations and the receiver being specified for each routing. Further the routing MS1,MS,MS3 is allocated the three time slots Slot1, Slot2 and Slot5 and the routing MS2,MS,MS4 the two time slots Slot3 and Slot4 of the following time frame.

FIGS. 5a to 5c show the five time slots Slot1, Slot2, Slot3, Slot4 and Slot5 of the time frame TFR following on from the transmitting of the message MESSAGE. In FIG. 5a the first two time slots Slot1 and Slot2 in accordance with the message MESSAGE are available for message transmission over the routing MS1,MS,MS3. Accordingly the mobile station MS1 uses the first time slot Slot1 for transmitting a first data packet and the mobile station MS routes this data packet in the second time slot Slot2 to the mobile station MS3. The following two time slots Slot3 and Slot4 are available for message transmission over the routing MS2,MS,MS4. Thus the mobile station MS2 uses the third time slot Slot3 for transmitting a data packet and the mobile station MS routes this data packet in the fourth time slot Slot4 to the mobile station MS4. The fifth time slot Slot5 has again been allocated for message transmission of the routing MS1,MS,MS3, the mobile station MS1 thus uses the time slot Slot5 for transmitting a second data packet to the mobile station MS.

The mobile stations MS, MS1, MS2, MS3 and MS4 employ the time slots assigned to the routings such that a data packet is completely transmitted over a routing before the next data packet is sent by the sender over the same routing. This type of use of the radio resources allocated to the routings can be notified to the mobile stations MS, MS1, MS2, MS3 and MS4 either in the message MESSAGE or in a notification sent beforehand which is valid for future time frames.

In the message MESSAGE the time slots are allocated to the routings such that a plurality of consecutive time slots are available for each routing, which corresponds to the number of hops of the routing concerned. Thus the two consecutive time slots Slot1 and Slot2 are available for message transmission over the routing MS1,MS,MS3, within which a data packet can be transmitted completely from the transmitter MS1 to the receiver MS3. Likewise the consecutive time slots Slot3 and Slot4 are available for message transmission over the routing MS2,MS,MS4, within which a data packet can be transmitted from the mobile station MS2 to mobile station MS4. Thus in relation to all routings which were allocated radio resources within time frame TFR both the transmitter and also each mobile station through which the relevant routing passes have been assigned radio resources. Since time frame TFR features five time slots, whereas only four time slots in all are needed for a complete message transmission over the routings MS1,MS,MS3 and MS2,MS,MS4, the remaining fifth time slot Slot5 will be allocated to one of the routings MS1,MS,MS3 and MS2,MS,MS4 to which radio resources are allocated in the time frame TFR. The message MESSAGE allocates the fifth time slot Slot5 to the routing MS1,MS,MS3, however there cannot be any complete message transmission with the remaining time slot Slot5 from the mobile station MS1 to the mobile station MS3.

In accordance with another method shown in FIG. 5b the time slots are allocated to the routings alternately so that the time slots Slot1, Slot3 and Slot5 are for example made available to the routing MS1,MS,MS3 and the time slots Slot2 and Slot4 to the routing MS2,MS,MS4. In this case the mobile station MS1 uses the first time slot Slot1 for transmitting a first data packet. In the following time slot Slot2 the mobile station MS2 sends a data packet. The mobile station MS routes the data packet received from mobile station MS1 in the third time slot Slot3 to the mobile station MS3 whereas it routes the data packet received from the mobile station MS2 to the mobile station MS4 in the fourth time slot Slot4. The fifth time slot Slot5 is used by the mobile station MS1 for transmitting a second data packet. The alternating allocation of radio resources to routings increases fairness between message transmission on different routings. With the distribution shown in FIG. 5a the case occurs in which message transmissions are handled over long routings in preference, by making available to them a larger volume of radio resources.

The assignment of time slots to mobile stations of a routing is undertaken in FIGS. 5a and 5b such that the chronological order of the assigned time slots corresponds to the order of transmitting or forwarding of a data packet over the relevant routing. This means for example in relation to the routing MS1,MS,MS3, that first a time slot of the mobile station MS1 and then a time slot of the mobile station MS is used. Then a further time slot can be allocated to the mobile station MS1 followed by a further time slot for the mobile station MS.

FIG. 5c shows the case in which there is a deviation from this procedure. The negative effects are explained with reference to FIG. 2. Like FIG. 5b the time slots have been allocated alternately to the two routings. Mobile station MS1 uses the first time slot Slot1 for transmitting the first data packet of the message MS1•MS3, mobile station MS2 uses the second time slot Slot2 for transmitting the first data packet of the message MS2-MS4. In the following third time slot Slot4 the mobile station MS1 sends the second data packet of the message MS1•MS3, whereas the mobile station MS2 sends the second data packet of the message MS2•MS4 in the fourth time slot Slot4. In the last time slot Slot5 the mobile station MS1 sends the third data packet of the message MS1•MS3. At the end of the time frame TFR the memory of the mobile station MS1 thus does not contain a data packet, the memory mobile station MS2 contains one data packet and the memory of the mobile station MS four data packets. The fifth data packet received by mobile station MS in the fifth time slot Slot5 must have been discarded since no memory space was present in the mobile station MS. To avoid memory overloads of this type the time slot in relation to a routing should be allocated to the mobile stations so that a mobile station which has used a time slot may not use another time slot until the other mobile stations of the routing have used a time slot.

In accordance with FIGS. 5a and 5b one data packet was transmitted completely in each case over the two routings MS1,MS,MS3 and MS2,MS,MS4 up to the end of the time frame TFR. A third data packet addressed to the mobile station MS3 has been sent from the mobile station MS1 to the mobile station MS. In relation to the next time frame the mobile station MS1 notifies the base station BS that it has a data packet to send to the mobile station MS3, the mobile station MS2 communicates the need to send two data packets to the mobile station MS4 and the mobile station MS the need to send a data packet to the mobile station MS3. As described above the base station BS determines the relevant routings between the mobile stations MS1 and MS3, MS2 and MS4, as well as MS and MS3. Knowledge about routings already determined beforehand can be used in routing determination. The mobile stations MS, MS1, MS2, MS3 and MS4 are notified about the routings and the assigned time slots in a message with a structure corresponding to the message MESSAGE. In this case the mobile station MS which has to forward the data packet from the mobile station MS1 to the mobile station MS3 is handled as if it were the original sender of the data packet.

However it is possible, on allocation of the radio resources in the device SCHEDULER, for mobile stations which have to forward data packets, to be handled in a prioritized manner. In this case the mobile station MS not only sends the notification to the base station BS after the end of the time frame TFR that it has to send a data packet to the mobile station MS3 but also that this transmission corresponds to a forwarding, so that it has received this data packet before from another mobile station without being the addressed recipient of the data packet. In this case the mobile station MS can be allocated the first time slot of the next time frame followed by an allocation of the remaining time slots according to a method as described for FIG. 5a or 5b.

A further option for handling mobile stations in the allocation of radio resources in a prioritized manner takes into account the memory status of the mobile stations. Accordingly time slots in large numbers and/or at the beginning of a time frame are allocated to those routings on which the sender has many data packets to send.

If many mobile stations communicate the need to send data packets it is possible that not all routings will be able to be allocated radio resources of the next time frame. The message MESSAGE only contains information about those routings which will also be allocated radio communications resources in the following time frame. Accordingly the device ROUTE CALCULATOR only has to determine a routing if the routing will be allocated radio resources in the next time frame. To this end there is a suitable exchange of information between the devices ROUTE CALCULATOR and SCHEDULER of the base station BS. This has the advantage that the routings are determined directly before they are used for message transmission so that current information about the network topology can be included. It is however also possible for the device ROUTE CALCULATOR to determine the relevant routings in relation to each request of a mobile station, said request however only being contained in the message MESSAGE if the routing was also allocated radio resources.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for communicating by radio in a cellular radio communications system having a base station and a plurality of radio stations, the method comprising:
    wirelessly transmitting a message from a subscriber-side transmitting radio station to a subscriber-side receiving radio station through a routing that passes through at least one relay radio station that forwards the message; and
    wirelessly sending from the base station information about the routing from the subscriber-side transmitting radio station to the subscriber-side receiving radio station and information about which radio resources are to be used for at least one radio transmission of the message,
    wherein the message is not transmitted from the subscriber-side transmitting radio station to the subscriber-side receiving radio station until after the base station sends the information about the routing.

2. The method in accordance with claim 1, wherein, the base station determines the routing using knowledge of adjacent positioning relationships between the radio stations.

3. The method in accordance with claim 1, wherein, the information about the routing and the information about the radio resources are sent in a common message.

4. The method in accordance with claim 1, wherein
    the information about the radio resources comprises an allocation of radio resources to the subscriber-side transmitting radio station of the routing and an allocation of radio resources to the relay radio station through which the routing passes.

5. The method in accordance with claim 1, wherein
    messages are transmitted between the radio stations in time slots, and
    the information about the radio resources comprises an allocation of at least one time slot to the subscriber-side transmitting radio station and/or to one or more relay radio stations through which the routing passes.

6. A method in accordance with claim 5, wherein,
    time slots are allocated so that the subscriber-side transmitting radio station and all relay radio stations are each assigned at least one time slot.

7. The method in accordance with claim 5, wherein,
    a plurality of consecutive time slots are grouped together into a time frame,
    the information is sent by the base station before or at the beginning of a time frame, and
    the information about the radio resources relates to time slots of the time frame.

8. The method in accordance with claim 5, wherein
    the subscriber-side transmitting radio station and the relay radio station are assigned chronologically consecutive time slots.

9. The method in accordance with claim 5, wherein
    the subscriber-side transmitting radio station and the relay radio station are assigned chronologically spaced time slots.

10. The method in accordance claim 5, wherein
    time slots are allocated to radio stations so that the chronological order of allocated time slots corresponds to the order of message transmission over the routing.

11. The method in accordance with claim 5, wherein
    time slots are allocated so that before beginning transmission of a second message over the routing, a first message previously sent is transmitted to the subscriber-side receiving radio station.

12. The method in accordance with claim 5, wherein
    time slots are grouped together into time frames such that each time frame has a plurality of consecutive time slots, and
    radio stations send information to the base station regarding a message to be sent at the beginning of or before a time frame.

13. The method in accordance with claim 12, wherein,
    the information regarding the message to be sent specifies a size of the message to be sent, and
    at least one time slot is allocated to the message to be sent so that the number and/or chronological position of the at least one time slot depends on the size of the message to be sent.

14. The method in accordance with claim 12, wherein,
    the number and/or chronological position of allocated time slots depends on the whether the radio station is sending a new message or forwarding a message previously received.

15. The method in accordance with claim 1, wherein
    the base station sends the information about the routing and the information about the radio resources via a broadcast transmission.

16. The method in accordance with claim 1, wherein a plurality of different messages are sent respectively from a plurality of different subscriber-side transmitting radio stations to a plurality of different subscriber-side receiving radio stations via a plurality of different routings, each through at least one relay radio station, and
    wherein the plurality of different subscriber-side transmitting radio stations and the plurality of different subscriber-side receiving radio stations are under the coverage of the base station.

17. The method in accordance with claim 1, wherein the base station is not one of the plurality of radio stations used to transmit or receive the message.

18. A base station for radio communication with radio stations in a cellular radio communications system, comprising:
    a memory to store adjacent positional relationships between the radio stations of the radio communications system; and
    a transmitter to wirelessly send information about a routing for a message to be sent wirelessly from a subscriber-side transmitting radio station to a subscriber-side receiving radio station via at least one relay radio station that forwards the message, the transmitter also sending information about which radio resources are to be used for at least one radio transmission of the message, wherein
    the message is not transmitted from the subscriber-side transmitting radio station to the subscriber-side receiving radio station until after the base station sends the information about the routing.

19. The base station in accordance with claim 18 further comprising:
    a route calculator to determine routings, each from a subscriber-side transmitting radio station to a subscriber-side receiving radio station; and
    a scheduler to allocate radio resources to the transmitting radio station and/or to the relay radio station.

20. The base station in accordance with claim 18 further comprising:
    a receiver to receive information about messages to be sent by radio stations.

21. A method for communicating by radio in a radio communications system, the method comprising:

receiving a request for wirelessly routing a message on a route from a subscriber-side transmitting radio station to a subscriber-side receiving radio station via at least one relay radio station that forwards the message, the request being received at a base station from the subscriber-side transmitting radio station;

determining the routing at the base station by assigning radio resources and at least one relay radio station to the route, the routing being determined based on knowledge of adjacent position relationships between the radio stations;

wirelessly sending a routing response from the base station, the routing response containing information identifying the at least one relay radio station and information about which radio resources are to be used; and transmitting the message on the route only after receiving the routing response.

* * * * *